United States Patent
Li et al.

(10) Patent No.: US 11,653,692 B2
(45) Date of Patent: May 23, 2023

(54) APPARATUS FOR ASSESSING HOT COAL FALLOUT PROPENSITY OF BURNING CIGARETTES BASED ON HUMAN BEHAVIOR FEATURES OF ASH-TAPPING ACTION AND METHOD THEREOF

(71) Applicants: ZHENGZHOU TOBACCO RESEARCH INSTITUTE OF CNTC, Zhengzhou (CN); HEFEI INSTITUTE OF PHYSICAL SCIENCE, CHINESE ACADEMY OF SCIENCES, Hefei (CN); CHINA TOBACCO JIANGXI INDUSTRIAL CO., LTD., Nanchang (CN)

(72) Inventors: Bin Li, Zhengzhou (CN); Yi Zhang, Nanchang (CN); Yaoshuo Sang, Hefei (CN); Mingjian Zhang, Zhengzhou (CN); Liu Hong, Nanchang (CN); Zhigang Li, Hefei (CN); Bingyang Xu, Nanchang (CN); Zhenyu Xu, Nanchang (CN); Xiaoling Tang, Nanchang (CN); Yong Liu, Hefei (CN)

(73) Assignees: ZHENGZHOU TOBACCO RESEARCH INSTITUTE OF CNTC, Zhengzhou (CN); HEFEI INSTITUTE OF PHYSICAL SCIENCE, CHINESE ACADEMY OF SCIENCES, Hefei (CN); CHINA TOBACCO JIANGXI INDUSTRIAL CO., LTD, Nanchang (CN)

( * ) Notice: Subject to any disclaimer, the term of this patent is extended or adjusted under 35 U.S.C. 154(b) by 696 days.

(21) Appl. No.: 16/608,144

(22) PCT Filed: Apr. 28, 2018

(86) PCT No.: PCT/CN2018/085077
§ 371 (c)(1),
(2) Date: Oct. 24, 2019

(87) PCT Pub. No.: WO2018/202004
PCT Pub. Date: Nov. 8, 2018

(65) Prior Publication Data
US 2020/0146337 A1 May 14, 2020

(30) Foreign Application Priority Data
May 3, 2017 (CN) .......................... 201710302981.9

(51) Int. Cl.
*A24C 5/343* (2006.01)
*A24C 5/34* (2006.01)
(Continued)

(52) U.S. Cl.
CPC ............ *A24C 5/343* (2013.01); *A24C 5/3406* (2013.01); *A24F 13/16* (2013.01); *G01M 7/08* (2013.01)

(58) Field of Classification Search
CPC ....... A24C 5/343; A24C 5/3406; A24F 13/16; G01M 7/08
See application file for complete search history.

(56) References Cited

FOREIGN PATENT DOCUMENTS

| CN | 204165850 U | * | 2/2015 | ............. G01N 3/307 |
| CN | 105571960 A | * | 5/2016 | ............. G01N 3/307 |

(Continued)

OTHER PUBLICATIONS

Machine Translation of CN 105651626 (Year: 2016).*
(Continued)

*Primary Examiner* — Alexander Satanovsky
*Assistant Examiner* — Lyudmila Zaykova-Feldman
(74) *Attorney, Agent, or Firm* — Lewis Roca Rothgerber Christie LLP

(57) ABSTRACT

The present disclosure provides a method for assessing hot coal fallout propensity of burning cigarettes based on human
(Continued)

behavior features of ash-tapping action. The method is characterized in that the method is accomplished through an apparatus for detecting hot coal fallout propensity based on human behavior features of ash-tapping action, which include behavior features of human action of tapping cigarette ash, features of holding a cigarette, and features of force applying process and other aspects. This method can provide objective and accurate test basis for evaluation of cigarette fallout performance.

16 Claims, 1 Drawing Sheet

(51) Int. Cl.
*A24F 13/16* (2006.01)
*G01M 7/08* (2006.01)

(56) References Cited

FOREIGN PATENT DOCUMENTS

| CN | 105651626 | A | * | 6/2016 | ............... | G01J 5/00 |
| CN | 106442901 | A | * | 2/2017 | ............... | G01N 33/00 |
| JP | H08159892 | A | * | 6/2000 | ............... | A24C 5/343 |
| JP | HO8159892 | A | * | 6/2000 | ............... | A24C 5/343 |
| KR | 101731465 | B1 | * | 4/2017 | ............... | F16H 25/08 |

OTHER PUBLICATIONS

Fu et al., Automatic cigarette ash flicking device, CN106442901, 2017, downloaded from Espacenet on Nov. 28, 2022 (Year: 2017).*
Duan et al., A device for detecting the U-turn of cigarettes, CN204165850U, 2015, downloaded from Espacenet on Nov. 28, 2022 (Year: 2015).*
Hayakawa et al., Cigarette quality measuring apparatus and measuring method, JPH08159892A, 2000, downloaded from Espacenet on Nov. 28, 2022 (Year: 2000).*
Yong et al., Cigarette ash drop measurement device, 2017, KR101731465B1, downloaded from Espacenet on Nov. 28, 2022 (Year: 2017).*
Hong et al., 2016, A device for detecting the performance of burning cone drop during cigarette smoking, CN105571960A, downloaded from Espacenet on Dec. 3, 2022 (Year: 2016).*
Lei et al., 2016, An automatic control detection device and detection method for cigarette burning cone drop performance, CN 105651626, downloaded from Espacenet on Dec. 3, 2022 (Year: 2016).*

* cited by examiner

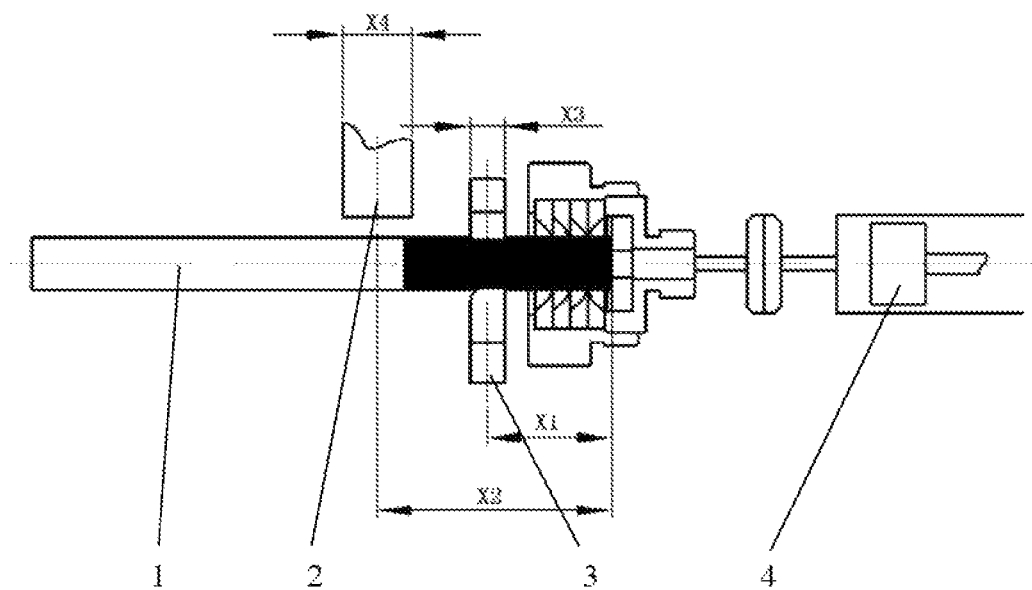

APPARATUS FOR ASSESSING HOT COAL FALLOUT PROPENSITY OF BURNING CIGARETTES BASED ON HUMAN BEHAVIOR FEATURES OF ASH-TAPPING ACTION AND METHOD THEREOF

CROSS-REFERENCE TO RELATED APPLICATION(S)

This application is a National Phase Patent Application of International Patent Application Number PCT/CN2018/085077, filed on Apr. 28, 2018, which claims priority of Chinese Patent Application 201710302981.9, filed May 3, 2017. The entire contents of both of which are incorporated herein by reference.

FIELD

The present disclosure belongs to the technical field of quality detection of cigarette products, and particularly relates to an apparatus for assessing hot coal fallout propensity of burning cigarettes based on human behavior features of ash-tapping action and a method thereof.

BACKGROUND

In recent years, consumers' resentment market feedback caused by combustion coal fallout of burning cigarettes has occurred frequently, and the range of involved brands has become more extensive, especially in high-grade cigarette products. During the process of cigarette consumption, the combustion coal fallout of burning cigarettes may not only cause cigarette loss to interrupt smoking, but falling butts may also lead to clothing, furniture burning and the risk of fire (Peace. World No Tobacco Day: Interpretation of cigarette butt [J]. China Fire, 2011 (11): 38-42.). The issue of cigarette fallout has been paid more attention, and the improvement approaches were hoped to be sought through technological innovation (WANG Haibin, LIU Dehu, WU Zhaogang, et al. Analysis and research on falling phenomenon of cigarette burning end [A]. China Tobacco Society 2010 Symposium Set, 2010, 285-287.).

Combustion coal fallout of burning cigarettes may be caused by matching of burning rate of cigarette paper with tobacco, filling of tobacco in cigarette paper, control of axial distribution by an ecreteur of cigarette maker during cigarette production and so on. Assessment of fallout performance is an important basis for evaluating the effectiveness of various technical improvements. Now, detection of fallout performance of burning cigarettes can only rely on consumer's conscious and qualitative judgment during cigarette smoking and flicking ash, leading to low efficiency and poor repeatability.

Chinese patent application (CN 102937639 A) has developed a fallout detection device for burning cigarettes by simulating consumer's action habits of flicking cigarette ash. This detection device determines the combustion coal fallout of burning cigarettes through intermittent tapping. The device uses a tapping method which is different from actual consumer's habit of flicking action, and test results of the method are too simple to give effective and objective evaluation.

A fallout detecting device for burning cigarettes involved in Chinese utility model application (CN 204165850 U) has improved problems in that the device disclosed in Chinese patent application (CN 102937639 A) cannot flexibly change tapping force and angle, but there are still some issues. The tapping method disclosed in the patent still relies on external mechanical force to slap cigarettes. Such flicking simulation may be performed by mechanical components with simple tapping action through surface tapping action, but actual stress situation in the process may be not considered in nature.

Chinese patent application (201310227468.X) has disclosed a device for detecting fallout propensity of burning cigarettes by rotation. The device is characterized in that it may comprise a base, a motor, a cigarette holding mechanism driven by the motor, and a safety shield. This disclosure tests combustion coal fallout phenomenon of burning cigarettes by rotation, which has developed a new method for detecting combustion coal. This new method obtains statistical data of fallout by multiple detections, thereby obtaining performance index of fallout propensity of burning cigarettes. The present disclosure has advantages in that rotation time and number of revolutions are controllable, different detection strengths can be applied on different samples, and a wide range of application can be obtained; the detection method is simple and convenient, spends short time, and has low detection cost. However, since there is no actual smoking process in this method, it does not meet human behavior of tapping ashes and flicking ashes, and there is still a problem in evaluating fallout performance of burning cigarettes in actual situation.

Chinese patent application (201510973214.1) provides an automatic control detection device and method for combustion coal fallout performance of burning cigarettes. The device and method are designed by studying comparison of mechanical behavior between machine tapping ash and human tapping ash so as to ensure mechanical dynamics behavior caused by tapping ash through a mechanical device to be consistent with human dynamics behavior. This may provide a unified, objective and accurate detection method for fallout propensity detection of cigarettes. But this method has not yet described how to establish a cigarette fallout propensity detection method based on behavior features of consumer's action of tapping cigarette ash. However, such falling behavior features are basic issue of the proposed and applied method for cigarette fallout performance evaluation, and it is more important to establish a simulated detecting method based on behavior features of human action of tapping cigarette ash.

SUMMARY

An object of the present disclosure is provided based on the deficiencies and issues in the above patents. Data of falling behavior features of tapping cigarette ash of cigarette consumers is obtained by investigation of falling behavior features of tapping cigarette ash of the cigarette consumers. The present disclosure provides an apparatus for assessing hot coal fallout propensity of burning cigarettes based on human behavior features of ash-tapping action and a method thereof. The present disclosure provides objective and accurate detection basis for evaluation of fallout performance of burning cigarettes.

One aspect of the present disclosure may provide an apparatus for assessing hot coal fallout propensity of burning cigarettes based on human behavior features of ash-tapping action. The apparatus may comprise:

a holding unit for holding a cigarette;

a suction unit connected to one end of the cigarette to suck the cigarette;

a tapping unit disposed adjacent to the holding unit, and the tapping unit being capable of tapping the cigarette; and a control unit coupled with the suction unit and the tapping unit, respectively, to control suction and tapping actions.

In an embodiment, the holding unit may be disposed at a filter tip of the cigarette, and the one end may be a free end of the filter tip.

In an embodiment, the tapping unit may comprise:
a tapping arm; and
a tapping hammer disposed at one end of the tapping arm to slap the cigarette under driving of the tapping arm.

In an embodiment, the tapping hammer may be made of a material with a Shore hardness in a range of 0.4 HA-5 HA.

In an embodiment, a tapping strength of the tapping hammer applied on the cigarette may be between 10 gf-30 gf.

In an embodiment, if the cigarette is a Superslim cigarette with a small diameter, duration for every tapping action applied by the tapping hammer may be between 0.095-0.105 seconds; and if the cigarette is a King Size cigarette with a large diameter, duration for every tapping action applied by the tapping hammer may be between 0.115-0.125 seconds.

In an embodiment, a width or diameter of the tapping hammer may be between 9.5 mm-10.5 mm, and a distance between a tapping point and the one end may be between 33 mm-38 mm.

In an embodiment, the holding unit may be made of a material with Shore hardness in a range of 0.4 HA-5.0 HA.

In an embodiment, a holding width of the holding unit holding the cigarette is between 9.5 mm-10.5 mm, a holding strength of the holding unit is between 16 gf-18 gf, and a distance from a holding point of the holding unit to the one end is between 19 mm-22 mm.

In an embodiment, the control unit is used to control a holding strength of the holding unit, a suction strength and a suction frequency of the suction unit, and a tapping cycle, a position of a tapping point and a tapping strength of the tapping unit.

Another aspect of the present invention may provide a method for assessing hot coal fallout propensity of burning cigarettes by using the apparatus for assessing hot coal fallout propensity of burning cigarettes, comprising:

step A: using the holding unit to hold the cigarette and ignite the cigarette;

step B: activating the suction unit by the control unit to suck the cigarette, so as to simulate smoking action of human;

step C: taking k times suction by the suction unit as a cycle, and activating the tapping unit by the control unit to perform a round of tapping actions on the cigarette to simulate human's tapping actions;

step D: stopping detection by the control unit when the cigarette has fallout or the cigarette is burned to a predetermined test termination mark; and step E: repeating the step B, the step C and the step D for 40 cigarettes, and recording an occurrence number n of fallout so as to calculate hot coal fallout propensity (HCFP) of burning cigarettes by using the following formula:

$$HCFP = n/40 \times 100\%$$

In an embodiment, the step A, the step B, the step C, the step D, and the step E may be performed in a constant temperature and humidity environment.

In an embodiment, a holding width of the holding unit holding the cigarette may be between 9.5 mm-10.5 mm, a holding strength of the holding unit may be between 16 gf-18 gf, and a distance from a holding point of the holding unit to the one end may be between 18 mm-20 mm.

In an embodiment, wherein in the step C, the one round of tapping actions may comprise performing 2-4 times of tapping actions on the cigarette by using the tapping unit, and an interval time between adjacent two tapping actions may be no longer than 1 second.

In an embodiment, wherein the tapping unit may comprise a tapping arm and a tapping hammer, an angle between the tapping arm and the cigarette may be between 30-60 degrees when the tapping hammer is in contact with the cigarette.

In an embodiment, wherein in said step C, a tapping strength of the tapping hammer applied on the cigarette may be between 20 gf-60 gf.

In an embodiment, wherein in said step C, a width of a tapping point, where the tapping hammer slaps at the cigarette, may be between 9.5 mm-10.5 mm, and a distance between the tapping point and the one end may be between 30 mm-32 mm.

In an embodiment, wherein two sets of tests may be applied to each cigarette sample, a final HCFP of the cigarette may be represented by an average value of the two sets of detection results after the step E, and the detection may be performed again when an absolute difference of two sets of detection results is greater than 20%.

The presenting disclosure may investigate the behavior of tapping cigarette ash by consumers. As for King Size cigarettes and Superslim cigarettes sold in the market, the present disclosure may be embodied based on behavior of tapping cigarette ash to apply a force to the ash, and obtain behavior characteristics data when a smoker slaps the cigarette to cause cigarette ash fallen down according to falling features of action of tapping cigarette ash, features of holding a cigarette, and features of force applying process and other aspects. Test operating conditions in the method for detecting cigarette fallout propensity may be formed based on the above data. Therefore, objective and accurate test basis for evaluation of cigarette fallout performance may be provided, and technical data support may be provided to related cigarette fallout research.

BRIEF DESCRIPTION OF THE DRAWINGS

FIG. 1 is a side view of an apparatus for assessing hot coal fallout propensity of burning cigarettes based on human behavior features of ash-tapping action according to an exemplary embodiment of the present disclosure.

Wherein: 1. Cigarette; 2. Tapping Hammer; 3. Cigarette Holder; 4. Suction unit; X1. Holding Position; X2. Tapping Position; X3. Holder Width; X4. Hammer Width.

DETAILED DESCRIPTION

Specific embodiments of the present invention will be further described in detail with reference to the accompanying drawings.

The present disclosure investigates behavior of flicking cigarette ash by consumers. As for King Size cigarettes and Superslim cigarettes sold in the market, the present disclosure may be embodied based on behavior of tapping cigarette ash to apply a force to the ash, and obtain behavior characteristics data when a smoker slaps the cigarette to cause cigarette ash fallen down according to action features of tapping cigarette ash, features of holding a cigarette, and features of force applying process and other aspects. Operating conditions in the method for detecting cigarette fallout propensity may be formed based on the above data.

TABLE 1 testing conditions for King Size cigarettes and Superslim
cigarettes determined under ash-tapping action behavior.

| Force applying mode | Ash-tapping action behavior | |
|---|---|---|
| Cigarette Type | King Size | Superslim |
| Strength of Force (gf) | 16 ± 0.5 | 14 ± 0.5 |
| Duration of Force Applied (s) | 0. 12 ± 0.005 | 0.10 ± 0.005 |
| Position of Force Applied (mm) | 34 ± 0.5 | 37 ± 0.5 |
| Holding Strength (gf) | 17 ± 0.5 | 15 ± 0.5 |
| Holding Position (mm) | 19 ± 0.5 | 22 ± 0.5 |
| Frequency of Force Applied | 4 | 2 |
| Time of Force Applied | Flicking action is applied after completing every suction of smoking after the second suction of smoking is taken | |
| Holding Width (mm) | 10 | |
| Hammer Width (mm) | 10 | |
| Ending Time (mm) | 44 ± 0.5 | 47 ± 0.5 |
| Smoking Mode | ISO3308 Standard Smoking Mode | |

The present disclosure may provide a testing device for hot coal fallout propensity (see FIG. 1) in accordance with the above operating conditions. The testing device may comprise a cigarette suction unit, a holding unit and a tapping unit. The specific conditions may be described as follows:

1. With a cigarette suction unit in accordance with GB/T 16450;

2. The tapping device unit may require that a Shore hardness of a material of a tapping hammer is 2.7±2.3 HA; the width or diameter of the tapping hammer may conform to (10±0.5) mm; the tapping strength may be adjustable within a range of (10-30) gf (tolerance±0.5 gf is allowed); the time for tapping action may be maintained for 0.12 s (tolerance±0.005s is allowed) for King Size cigarette and 0.1 s (tolerance±0.005s is allowed) for Superslim cigarette; the tapping position may be adjustable within a range of (33-38) mm (tolerance±0.5 mm is allowed); and the tapping frequency may control the setting of four tapping actions and 2-4 times of continuous tapping actions per round (interval time between two tapping actions may be no more than 1 s);

3. The material of a cigarette holder in the holding unit may be selected based on simulated human fingers, and its Shore hardness may be 2.7±2.3 HA; a width of the cigarette holder may be 10±0.5 mm according to smoker's tapping habit; the holding strength may be adjustable within a range of 15-17 gf and the tolerance of ±0.5 gf may be allowed; the holding position may be adjustable within a range of 19-22 mm and the tolerance of ±0.5 mm may be allowed; and the device may also have a control unit for controlling the tapping strength, the time of tapping action, the tapping position, the tapping time, the holding strength, and the holding position and similar parameter.

Embodiment 1

A King Size cigarette (brand A) may be selected as a test sample. The present disclosure may be implemented in accordance with the following test condition settings and operational steps:

Step 1: A sample may be placed under a constant temperature and humidity environment and adjusted according to GB/T 16447. The laboratory test atmosphere for hot coal fallout propensity test shall also be complied with provisions of GB/T 16447.

Step 2: Setting test operational conditions according to specifications of cigarettes.

The tapping strength of the hot coal fallout propensity test device may be set to be 16±0.5 gf; the time of tapping action may be set to be 0.12±0.005 s; the tapping position of the hot coal fallout propensity test device may be set to be 34±0.5 mm; a termination mark position of hot coal fallout propensity test of burning cigarettes of the test device for hot coal fallout propensity may be set to be 44±0.5 mm; the tapping time of the hot coal fallout propensity test device may be set as follows: starting from the second suction of smoking, one round of tapping action is applied respectively after every suction, until the termination mark position is reached; the tapping frequency of the test device for hot coal fallout propensity may be set as follows: four tapping actions are applied per round, the interval time between two tapping actions is not more than 1 s; the holding strength of the test device for hot coal fallout propensity may be set to be 17±0.5 gf; the holding position of the test device for hot coal fallout propensity may be set to be 19±0.5 mm; and the smoking mode of the test device for hot coal fallout propensity may be set to be ISO3308 standard smoking mode.

Step 3: An adjusted cigarette sample is inserted into a cigarette holder and performs smoking and tapping actions under test conditions.

Step 4: When hot coal fallout occurred during smoking or the termination mark position of the cigarette hot coal fallout propensity test is reached, the test is completed and state information of "falling" and "not falling" of the cigarette hot coal and suction numbers of the fallout are recorded.

Step 5: 40 cigarettes are repeatedly tested and the cigarette hot coal fallout propensity is calculated as the result of a set of cigarettes.

Step 6: Every sample is tested for twice.

Step 7: Every sample is tested for twice.

The results of recording test data, which present the cigarettes' hot coal fallout propensity (HCFP), are calculated according to equation (1):

$$HCFP = \frac{n}{40} \times 100\% \qquad (1)$$

wherein:

HCFP—Cigarette hot coal fallout propensity, %;

n—Numbers of cigarettes having fallout phenomenon.

The numbers of cigarettes having fallout phenomenon in two sets of 40 cigarettes are 9 and 10, respectively.

Step 8: Analyzing and determining results. Two testing results are 22.5% and 25.0%, respectively. The absolute difference of the parallel test results is not more than 20.0%, and the test result is 23.8%.

Embodiment 2

A Superslim cigarette (brand B) is selected as a test sample. The present disclosure may be implemented in accordance with the following test condition settings and operational steps:

Step 1: A sample may be placed under a constant temperature and humidity environment and adjusted according to GB/T16447. The laboratory test atmosphere for hot coal fallout propensity test shall also be complied with provisions of GB/T16447.

Step 2: Setting test operational conditions according to specifications of cigarettes.

The tapping strength of the hot coal fallout propensity test device may be set to be 14±0.5 gf; the time of tapping action may be set to be 0.10±0.005 s; the tapping position of the hot coal fallout propensity test device may be set to be 37±0.5 mm; a termination mark position of hot coal fallout propensity test of burning cigarettes of the test device for hot coal fallout propensity may be set to be 47±0.5 mm; the tapping time of the hot coal fallout propensity test device may be set as follows: starting from the second suction of smoking, one round of tapping action is applied respectively after every suction, until the termination mark position is reached; the tapping frequency of the test device for hot coal fallout propensity may be set as follows: two tapping actions are applied per round, the interval time between two tapping actions is not more than 1 s; the holding strength of the test device for hot coal fallout propensity may be set to be 15±0.5 gf; the holding position of the test device for hot coal fallout propensity may be set to be 22±0.5 mm; and the smoking mode of the test device for hot coal fallout propensity may be set to be ISO3308 standard smoking mode.

Step 3: An adjusted cigarette sample is inserted into a cigarette holder and performs smoking and tapping actions under test conditions.

Step 4: When fallout phenomenon occurred on the cigarette butt during smoking or the termination mark position of the cigarette hot coal fallout propensity test is reached, the test is completed and state information of "falling" and "not falling" of the cigarette hot coal and suction numbers of the fallout are recorded.

Step 5: 40 cigarettes are repeatedly tested and the cigarette hot coal fallout propensity is calculated as the result of a set of test results cigarettes.

Step 6: Every sample is tested for twice.

Step 7: The test results are calculated.

The results of recording test data, which present the cigarette hot coal fallout propensity (HCFP), are calculated according to equation (1):

$$HCFP = \frac{n}{40} \times 100\% \tag{1}$$

wherein:
HCFP—Cigarette hot coal fallout propensity, %;
n—Numbers of cigarettes having fallout phenomenon.

The numbers of cigarettes having fallout phenomenon in two sets of 40 cigarettes are 6 and 6, respectively.

Analyzing and determining results. Two testing results are 15.0% and 15.0%, respectively. The absolute difference of the parallel test results is not more than 20.0%, and the test result is 15.0%.

What is claimed is:

1. An apparatus for assessing hot coal fallout propensity of burning cigarettes based on human behavior features of ash-tapping action, comprising:
   a holding unit for holding a cigarette;
   a suction unit connected to one end of the cigarette to suck the cigarette;
   a tapping unit disposed adjacent to the holding unit, and the tapping unit being capable of tapping the cigarette; and
   a control unit coupled with the suction unit and the tapping unit, respectively, to control suction and tapping actions,
   wherein the tapping unit comprises: a tapping arm; and a tapping hammer disposed at one end of the tapping arm to slap the cigarette under driving of the tapping arm, and
   wherein a width or diameter of the tapping hammer is between 9.5 mm-10.5 mm, and a distance between a tapping point and the one end is between 33 mm-38 mm.

2. The apparatus according to claim 1, wherein the holding unit is disposed at a filter tip of the cigarette, and the one end is a free end of the filter tip.

3. The apparatus according to claim 1, wherein the tapping hammer is made of a material with a Shore hardness in a range of 0.4HA-5HA.

4. The apparatus according to claim 1, wherein a tapping strength of the tapping hammer applied on the cigarette is between 10gf-30gf.

5. The apparatus according to claim 1, wherein:
   if the cigarette is a Superslim cigarette with a small diameter, duration for every tapping action applied by the tapping hammer is between 0.095-0.105 seconds; and
   if the cigarette is a King Size cigarette with a large diameter, duration for every tapping action applied by the tapping hammer is between 0.115-0.125 seconds.

6. The apparatus according to claim 1, wherein the holding unit is made of a material with Shore hardness in a range of 0.4HA-5.0HA.

7. The apparatus according to claim 1, wherein a holding width of the holding unit holding the cigarette is between 9.5 mm-10.5 mm, a holding strength of the holding unit is between 16gf-18gf, and a distance from a holding point of the holding unit to the one end is between 19 mm-22 mm.

8. The apparatus according to claim 1, wherein the control unit is used to control a holding strength of the holding unit, a suction strength and a suction frequency of the suction unit, and a tapping cycle, a position of a tapping point and a tapping strength of the tapping unit.

9. A method for assessing hot coal fallout propensity of burning cigarettes by using the apparatus for assessing hot coal fallout propensity of burning cigarettes according to claim 1, comprising:
   step A: using the holding unit to hold the cigarette and ignite the cigarette; step B: activating the suction unit by the control unit to suck the cigarette, so as to simulate smoking action of human;
   step C: taking k times suction by the suction unit as a cycle, and activating the tapping unit by the control unit to perform a round of tapping actions on the cigarette to simulate human's tapping actions;
   step D: stopping detection by the control unit when the cigarette has fallout or the cigarette is burned to a predetermined test termination mark; and
   step E: repeating the step B, the step C and the step D for 40 cigarettes, and recording an occurrence number n of fallout so as to calculate hot coal fallout propensity (HCFP) of burning cigarettes by using the following formula:

$HCFP=n/40\times100\%.$

10. The method according to claim 9, wherein the step A, the step B, the step C, the step D, and the step E are performed in a constant temperature and humidity environment.

11. The method according to claim 9, wherein a holding width of the holding unit holding the cigarette is between 9.5mm-10.5mm, a holding strength of the holding unit is between 16gf-18gf, and a distance from a holding point of the holding unit to the one end is between 18mm-20mm.

12. The method according to claim 9, wherein in the step C, the one round of tapping actions comprise performing 2-4 times of tapping actions on the cigarette by using the tapping unit, and an interval time between adjacent two tapping actions is no longer than 1 second.

13. The method according to claim 9, wherein the tapping unit comprises a tapping arm and a tapping hammer, an angle between the tapping arm and the cigarette is between 30-60 degrees when the tapping hammer is in contact with the cigarette.

14. The method according to claim 13, wherein in said step C, a tapping strength of the tapping hammer applied on the cigarette is between 20gf-60gf.

15. The method according to claim 13, wherein in said step C, a width of a tapping point, where the tapping hammer slaps at the cigarette, is between 9.5mm-10.5mm, and a distance between the tapping point and the one end is between 30mm-32mm.

16. The method according to claim 9, wherein two sets of tests are applied to each cigarette sample, a final HCFP of the cigarette is represented by an average value of the two sets of detection results after the step E, and the detection is performed again when an absolute difference of two sets of detection results is greater than 20%.

\* \* \* \* \*